US012539709B2

(12) United States Patent
Takezawa

(10) Patent No.: US 12,539,709 B2
(45) Date of Patent: Feb. 3, 2026

(54) PRINTER APPARATUS THAT CONVEYS PRINTING PAPER BY SET FEEDING AMOUNT AND SET BACK-FEEDING AMOUNT

(71) Applicant: Toshiba Tec Kabushiki Kaisha, Tokyo (JP)

(72) Inventor: Fusayoshi Takezawa, Hachioji Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 153 days.

(21) Appl. No.: 18/511,217

(22) Filed: Nov. 16, 2023

(65) Prior Publication Data

US 2024/0326481 A1 Oct. 3, 2024

(30) Foreign Application Priority Data

Mar. 27, 2023 (JP) ............................ JP2023-050498

(51) Int. Cl.

| | |
|---|---|
| ***B41J 13/00*** | (2006.01) |
| ***B41J 2/325*** | (2006.01) |
| ***B41J 3/407*** | (2006.01) |
| ***B41J 11/00*** | (2006.01) |
| ***B41J 11/04*** | (2006.01) |

(Continued)

(52) U.S. Cl.

CPC ........... *B41J 13/0036* (2013.01); *B41J 2/325* (2013.01); *B41J 3/4075* (2013.01); *B41J 11/007* (2013.01); *B41J 11/04* (2013.01); *B41J 11/42* (2013.01); *B41J 13/08* (2013.01); *B41J 15/04* (2013.01); *B41J 25/304* (2013.01); *B41J 29/026* (2013.01);

(Continued)

(58) Field of Classification Search

CPC .... B41J 13/0036; B41J 3/4075; B41J 11/007; B41J 11/04; B41J 13/08; B41J 29/13; B41J 2/325; B41J 11/66; B41J 11/42; B41J 25/304; B41J 29/026; B41J 31/00; B41J 2/32; B41J 15/04

See application file for complete search history.

(56) References Cited

U.S. PATENT DOCUMENTS

2003/0156177 A1* 8/2003 Nishikawa ........... B41J 11/0045 347/102
2014/0055547 A1* 2/2014 Mori ........................ B41J 2/325 347/217

(Continued)

FOREIGN PATENT DOCUMENTS

JP 2009-184156 A 8/2009
JP 2020-097133 A 6/2020

OTHER PUBLICATIONS

Extended European Search Report mailed Jun. 6, 2024 in corresponding European Patent Application No. 23217017.5, 7 pages.

*Primary Examiner* — Henok D Legesse
(74) *Attorney, Agent, or Firm* — Kim & Stewart LLP

(57) ABSTRACT

According to an embodiment, a printer apparatus sets a feeding amount when ejecting label paper from a paper ejection port of an attachment in accordance with a distance from a paper ejection port to the paper ejection port of the attachment. Further, the printer apparatus sets a back-feeding amount when reversely feeding the label paper after printing ejected from the paper ejection port of the attachment to a next printing position in accordance with presence or absence of a head-up function of the printer apparatus.

9 Claims, 6 Drawing Sheets

(51) Int. Cl.

| | |
|---|---|
| ***B41J 11/42*** | (2006.01) |
| ***B41J 13/08*** | (2006.01) |
| ***B41J 15/04*** | (2006.01) |
| ***B41J 25/304*** | (2006.01) |
| ***B41J 29/02*** | (2006.01) |
| ***B41J 29/13*** | (2006.01) |
| ***B41J 31/00*** | (2006.01) |
| *B41J 2/32* | (2006.01) |
| *B41J 11/66* | (2006.01) |

(52) U.S. Cl.

CPC ............... *B41J 29/13* (2013.01); *B41J 31/00* (2013.01); *B41J 2/32* (2013.01); *B41J 11/66* (2013.01)

(56) References Cited

U.S. PATENT DOCUMENTS

| | | | | |
|---|---|---|---|---|
| 2014/0267477 | A1 | 9/2014 | Raming | |
| 2018/0170076 | A1 | 6/2018 | Wakamatsu | |
| 2019/0299658 | A1 | 10/2019 | Mizutani | |
| 2021/0276344 | A1* | 9/2021 | Wada .................. | B41J 11/0095 |

* cited by examiner

200

| | Ribbon saving (head-up) mechanism | |
|---|---|---|
| | With | Without |
| Distance between thermal head and paper ejection port | Da(mm) | |
| Attachment extension distance | Db(mm) | |
| Fine adjustment amount (A) | Za(mm) | – |
| Fine adjustment amount (B) | – | Zb(mm) |
| Gap between labels | G(mm) | |
| Minimum label pitch | Pa(mm) | Pb(<Pa)(mm) |

Fig.4

PRINTER APPARATUS THAT CONVEYS PRINTING PAPER BY SET FEEDING AMOUNT AND SET BACK-FEEDING AMOUNT

CROSS-REFERENCE TO RELATED APPLICATIONS

This application is based upon and claims the benefit of priority from the prior Japanese Patent Application No. 2023-50498, filed on Mar. 27, 2023, the entire contents of which are incorporated herein by reference.

FIELD

An embodiment to be described here generally relates to a printer apparatus.

BACKGROUND

In the past, a thermal transfer printer apparatus that prints on printing paper by heating an ink ribbon and a thermal printer apparatus that prints on thermal printing paper have been known.

When printing with such an existing printer apparatus, the trailing edge of the label gets caught in a thermal head during reverse conveyance of label paper, which causes deformation or turning up of the label in some cases. In order to prevent the turning up from occurring, it has been common practice to set a limit on the label length such that the trailing edge of the label does not go beyond the thermal head in the case where the label paper after printing is conveyed to the cutting position. Therefore, in the case where the feeding distance of the label paper after printing is long, e.g., in the case of printing on a label with a short label length or attaching various attachments to a paper ejection port, there has been a problem that the label gets caught in the thermal head during reverse conveyance of the label paper.

BRIEF DESCRIPTION OF THE DRAWINGS

FIG. 4 is a diagram describing various parameters to be set by the printer apparatus according to the embodiment.

DETAILED DESCRIPTION

Figure 1:
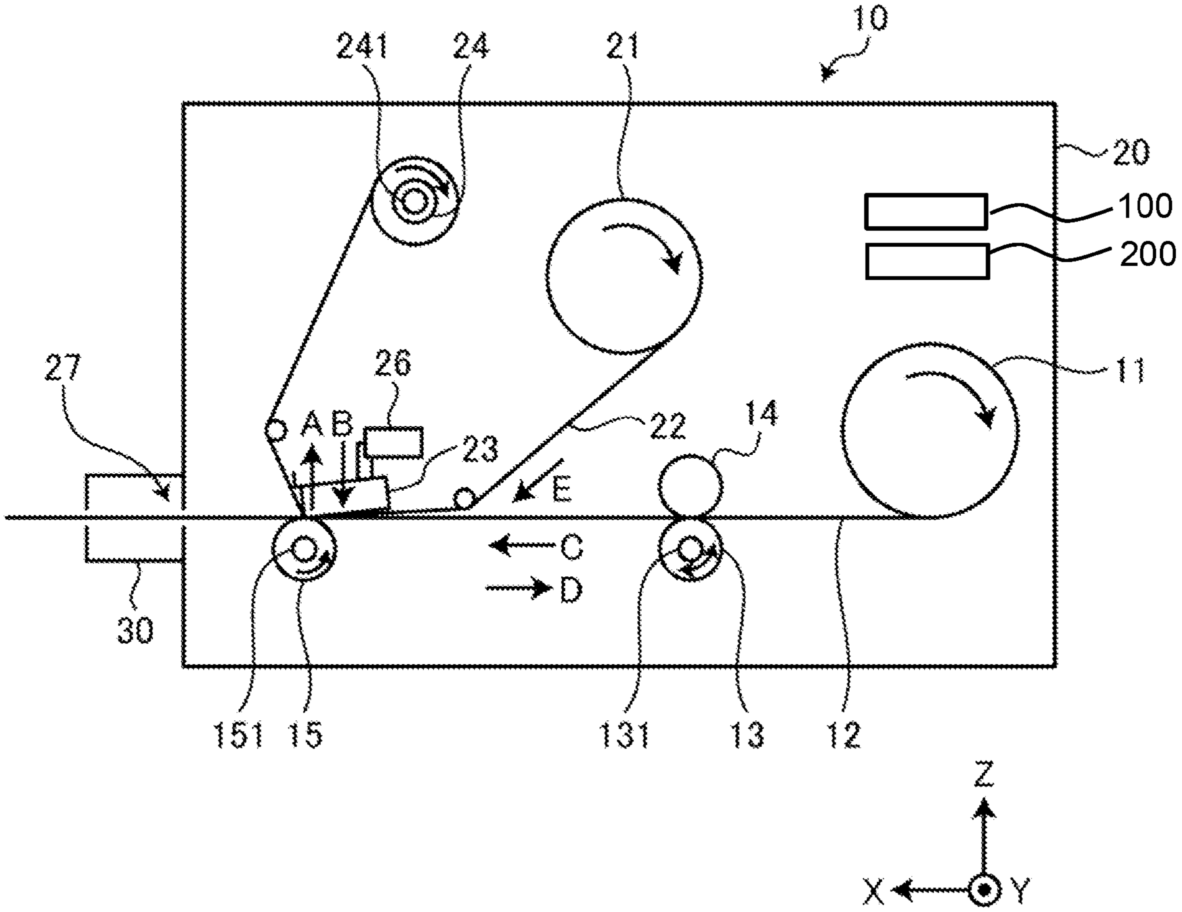
FIG. 1 is a diagram showing an example of a printer apparatus according to an embodiment.

According to an embodiment, a printer apparatus includes a print head for printing on printing paper. The printer apparatus includes an apparatus that has a head-up function for moving the print head between a position where printing on the printing paper is available and a position where printing on the printing paper is not available and an apparatus that does not have the head-up function. The printer apparatus includes: a casing; an attachment; a conveying device; an information acquisition processor; a setting processor; and an engine control processor. The casing includes a paper ejection port for ejecting the printed printing paper. The attachment includes a paper ejection port for receiving the printing paper ejected from the casing and then ejecting the received printing paper and is detachably/attachably connected to the paper ejection port of the casing. The conveying device conveys the printing paper after printing in forward rotation to eject the printing paper from the paper ejection port of the attachment and conveys the printing paper in reverse rotation for next printing. The information acquisition processor acquires information from the paper ejection port of the casing to the paper ejection port of the attachment. The setting processor sets, in accordance with the acquired distance, a feeding amount of the printing paper after printing when ejecting the printing paper after printing from the paper ejection port of the attachment. Further, the setting processor sets, in accordance with presence or absence of the head-up function, a back-feeding amount when conveying the printing paper ejected from the paper ejection port of the attachment to a position for next printing in reverse rotation. The engine control processor causes the conveying device to convey the printing paper in forward rotation by the set feeding amount to eject the printing paper after printing. Further, the engine control processor causes the conveying device to convey the printing paper in reverse rotation by the set back-feeding amount to return the printing paper to a next printing position before next printing.

An embodiment will be described below in detail with reference to the drawings. In the drawings, the same reference symbols denote the same or similar portions. Note that the embodiment is not limited by the following description.

(Schematic Configuration of Printer Apparatus)

A schematic configuration of a printer apparatus 10 according to an embodiment will be described with reference to FIG. 1. FIG. 1 is a diagram showing an example of a schematic configuration of a printer apparatus according to an embodiment.

The printer apparatus 10 is a so-called thermal transfer printer that prints on a label 122 (see FIG. 2) placed on label paper 12 by heating an ink ribbon 22. The printer apparatus 10 prints on the label paper 12 while pulling out the label paper 12 from rolled paper 11 that is the label paper 12 wound into a roll. The structure of the label paper 12 will be described below in detail (see FIG. 2). Note that the label paper 12 is an example of printing paper in the present disclosure.

The printer apparatus 10 includes, inside a casing 20, a conveying roller 13, a pinch roller 14, a platen roller 15, and a thermal head 23.

The conveying roller 13 is driven to rotate counterclockwise or clockwise by a drive motor 131.

The pinch roller 14 sandwiches the label paper 12 between the pinch roller 14 and the conveying roller 13. The pinch roller 14 rotates along with the counterclockwise rotation of the conveying roller 13 to convey (feed) the label paper 12 pulled out from the rolled paper 11 toward a paper ejection port 27 in forward rotation along the direction of an arrow C. Note that in the following description, conveying in forward rotation will be referred to simply as conveying in some cases.

Further, the pinch roller 14 rotates along with the clockwise rotation of the conveying roller 13 to convey (back-feed) the label paper 12 from the paper ejection port 27 toward the upstream side in reverse rotation along the direction of an arrow D.

The platen roller 15 is driven to rotate counterclockwise by a drive motor 151. The platen roller 15 conveys the label paper 12 sandwiched between the platen roller 15 and the thermal head 23 toward the paper ejection port 27 along the direction of the arrow C.

Note that the platen roller 15 conveys the label paper 12 while the thermal head 23 and the platen roller 15 abut on each other. Meanwhile, the conveying roller 13 and the pinch roller 14 conveys the label paper 12 while the thermal head 23 and the platen roller 15 do not abut on each other.

The thermal head 23 has a structure in which a plurality of heating elements is aligned, and prints on the label paper 12 sandwiched between the thermal head 23 and the platen roller 15 by causing the heating element corresponding to the printing pattern to generate heat. Note that the thermal head 23 ascends by the action of a solenoid 26 in the direction of an arrow A (Z-axis positive direction). Further, the thermal head 23 descends by the action of the solenoid 26 in the direction of an arrow B (Z-axis negative direction). This allows it to switch between the state where the thermal head 23 and the platen roller 15 abut on each other (head-down state) and the state where the thermal head 23 and the platen roller 15 do not abut on each other (head-up state). Note that the thermal head 23 is an example of a print head in the present disclosure.

Note that the ink ribbon 22 is inserted between the thermal head 23 and the platen roller 15. The ink ribbon 22 is wound to form a ribbon roll 21 while the ink ribbon 22 is not in use. The ink ribbon 22 is wound up on a winding shaft 24 that is driven to rotate clockwise by a drive motor 241 and moves in the direction of an arrow E. The ink applied to the ink ribbon 22 melts by the heated thermal head 23 and is transferred to the label paper 12.

The ink ribbon 22 is conveyed while being in contact with the label paper 12 at the position of the thermal head 23 and is wound up by the winding shaft 24. However, the ink ribbon 22 is wound up by the winding shaft 24 even in the case where printing on the label paper 12 is not performed for a long time, which ends up as waste. For this reason, in the case where printing on the label paper 12 is not performed for a long time, the printer apparatus 10 makes the thermal head 23 in the head-up state such that the thermal head 23 and the platen roller 15 do not abut on each other. At this time, the printer apparatus 10 further stops the drive motor 241 to stop the conveyance of the ink ribbon 22. As a result, only the label paper 12 is conveyed, which makes it possible to reduce the consumption of the ink ribbon 22. That is, by using the head-up function, it is possible to reduce the consumption of the ink ribbon 22, i.e., save ribbons.

The label paper 12 that has been printed is further conveyed and ejected from the paper ejection port 27. Note that the label paper 12 that has been printed and ejected from the paper ejection port 27 may be cut by hand at the position of the paper ejection port 27 or may be cut by a cutter installed in the vicinity of the paper ejection port 27 depending on the printer apparatus 10.

Various attachments 30 are attached to the paper ejection port 27 of the printer apparatus 10 in some cases. Examples of the attachment 30 include a cutter unit that cuts the printed label paper 12, a peeling unit that peels off a label from the printed label paper 12, and an RFID module that writes information to a wireless tag (e.g., RFID tag) embedded in the printed label paper 12.

(Structure of Label Paper)

Figure 2:
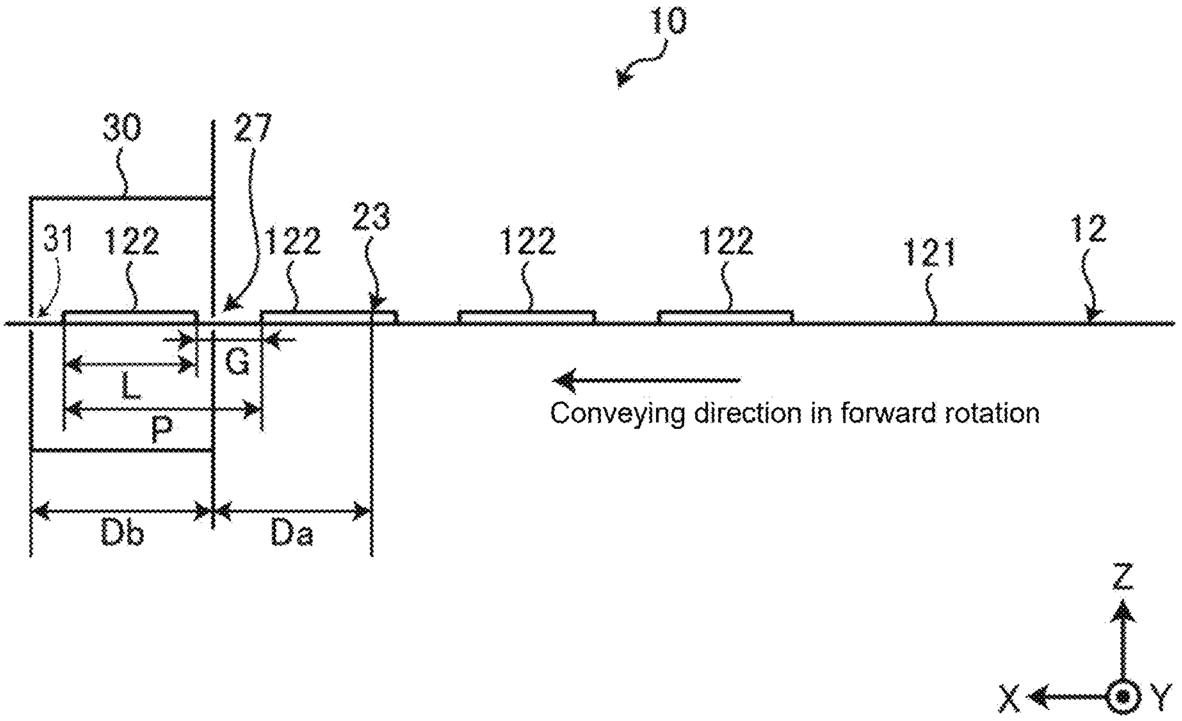
FIG. 2 is a diagram showing an example of a structure of label paper on which printing is performed by the printer apparatus according to the embodiment.

A structure of the label paper 12 will be described with reference to FIG. 2. FIG. 2 is a diagram showing an example of a structure of label paper on which printing is performed by the printer apparatus.

The label paper 12 has a structure in which a plurality of labels 122 having the same size is placed on mounting paper 121 at predetermined intervals. Note that the label 122 may be one that includes an adhesive layer on the back surface thereof and is attached to the mounting paper 121 that is release paper in a peelable manner.

Further, the label 122 may contain a wireless tag (e.g., RFID tag).

The length of the label 122 along the conveying direction is a label length L as shown in FIG. 2.

There is a gap corresponding to a gap G between labels between the labels 122 adjacent to each other in the conveying direction.

A distance between the end portion of a certain label 122 on the downstream side and the end portion of the label 122 adjacent thereto on the downstream side has a value corresponding to a label pitch P (=L+G).

Note that the distance between the thermal head 23 and the paper ejection port 27 in the printer apparatus 10 is a distance Da between a thermal head and a paper ejection port shown in FIG. 2. Further, when the attachment 30 is attached to the printer apparatus 10, the distance between the paper ejection port 27 and a paper ejection port 31 of the attachment 30 is an attachment extension distance Db shown in FIG. 2.

In the case where the attachment 30 is not attached to the printer apparatus 10, the printer apparatus 10 needs to expose at least the entire label 122 that has been printed outside the paper ejection port 27 by conveying the tip of the label paper 12 that has been printed. For this reason, the printer apparatus 10 conveys the label paper 12 that has been printed in the X-axis positive direction in FIG. 2 by the amount corresponding to the label length L and the distance Da between a thermal head and a paper ejection port.

Further, in the case where the attachment 30 is attached to the printer apparatus 10, the printer apparatus 10 needs to expose at least the entire label 122 that has been printed outside the paper ejection port 31 of the attachment 30 by conveying the tip of the label paper 12 that has been printed. For this reason, the printer apparatus 10 conveys the label paper 12 that has been printed in the X-axis positive direction in FIG. 2 by the amount corresponding to the label length L, the distance Da between a thermal head and a paper ejection port, and the attachment extension distance Db.

(Functional Configuration of Printer Apparatus)

Figure 3:
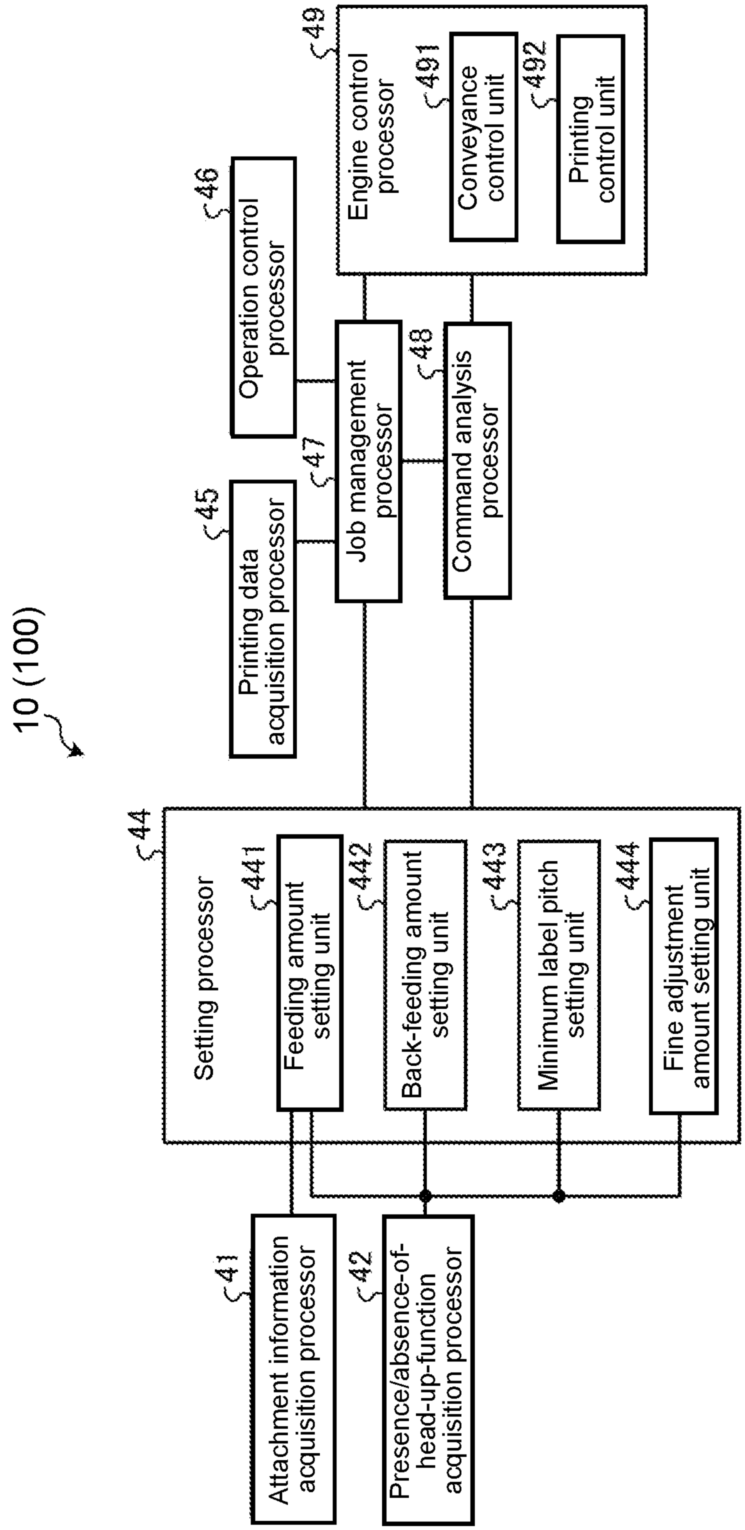
FIG. 3 is a functional block diagram showing an example of a functional configuration of the printer apparatus according to the embodiment.

A functional configuration of the printer apparatus 10 according to the embodiment will be described with reference to FIG. 3. The printer apparatus 10 includes a processor 100. FIG. 3 is a functional block diagram showing an example of the functional configuration of the processor 100 of the printer apparatus according to the embodiment.

The processor 100 of the printer apparatus 10 includes an attachment information acquisition processor 41, a presence/absence-of-head-up-function acquisition processor 42, a setting processor 44, a printing data acquisition processor 45, an operation control processor 46, a job management processor 47, a command analysis processor 48, and an engine control processor 49 shown in FIG. 3.

The processor 100 is, for example, a CPU. The processor 100 is realized by a control program operated by the CPU. Note that part or all of the processor 100 may be realized by dedicated hardware.

The attachment information acquisition processor 41 acquires information indicating whether or not the attachment 30 is attached to the paper ejection port 27 of the printer apparatus 10 and the attachment extension distance Db of the attachment 30 in the case where the attachment 30 is attached to the paper ejection port 27.

Specifically, the attachment information acquisition processor 41 acquires information for specifying the attached attachment 30 in accordance with a user's instruction. Further, the attachment information acquisition processor 41 may uniquely specify the type of attached attachment 30 by the contact between an electrical contact of the attachment 30 and an electrical contact of the printer apparatus 10.

The presence/absence-of-head-up-function acquisition processor 42 acquires information indicating whether or not the printer apparatus 10 has a head-up function. Specifically, the presence/absence-of-head-up-function acquisition processor 42 determines whether or not the printer apparatus 10 has a head-up function by referring to the content of a function master file (not shown) that is stored in the printer apparatus 10 and shows a list of functions that the printer apparatus 10 has.

The setting processor 44 sets various settings relating to the conveyance of the label paper 12 when using the printer apparatus 10 to print.

The setting processor 44 further includes a feeding amount setting unit 441, a back-feeding amount setting unit 442, a minimum label pitch setting unit 443, and a fine adjustment amount setting unit 444.

The feeding amount setting unit 441 sets, in accordance with the distance acquired by the attachment information acquisition processor 41, a feeding amount of the label paper 12 after printing when ejecting the label paper 12 after printing from the paper ejection port 31 of the attachment 30.

The back-feeding amount setting unit 442 sets, in accordance with the presence or absence of the head-up function of the printer apparatus 10, a back-feeding amount when conveying the label paper 12 after printing, which has been ejected from the paper ejection port 31 of the attachment 30, to the position for the next printing in reverse rotation.

The minimum label pitch setting unit 443 sets, in accordance with the presence or absence of the head-up function of the printer apparatus 10, the minimum value of the label pitch P that is the interval between upstream end portions of the labels 122 adjacent to each other in the label paper 12 or the interval between downstream end portions of the labels 122 adjacent to each other in the label paper 12.

The fine adjustment amount setting unit 444 sets the fine adjustment amount of the feeding amount of the label paper 12 after printing in accordance with the presence or absence of the head-up function of the printer apparatus 10. Specifically, in the case where the printer apparatus 10 has a head-up function, the fine adjustment amount setting unit 444 sets a fine adjustment amount Za (see FIG. 4) of the feeding amount and the back-feeding amount of the label paper 12 after printing. Meanwhile, in the case where the printer apparatus 10 does not have a head-up function, the fine adjustment amount setting unit 444 sets a fine adjustment amount Zb (see FIG. 4) of the feeding amount and the back-feeding amount of the label paper 12 after printing. Note that the fine adjustment amount of the feeding amount and the fine adjustment amount of the back-feeding amount may be set to have different values.

Further, even in the same printer apparatus 10, the frictional force with each type of roller included in the printer apparatus 10 differs in some cases depending on the material of the label paper 12 to be used, or the like. For this reason, even if the same conveyance amount is set in the printer apparatus 10, there are differences in the actual amount of conveyance of the label paper 12 in some cases depending on the type of label paper 12. Each of the fine adjustment amounts Za and Zb is a type of bias value for suppressing such variations in conveyance amount. The fine adjustment amount setting unit 444 may set the fine adjustment amount by, for example, referring to a setting map of the fine adjustment amount according to the type of label paper 12, which is stored in the printer apparatus 10 in advance. Further, the setting map of the fine adjustment amount may store the fine adjustment amount according to the presence or absence of the head-up function and the type of label paper 12.

The printing data acquisition processor 45 acquires printing data to be printed on the printer apparatus 10. Specifically, the printing data acquisition processor 45 acquires printing data from an external device such as a personal computer connected to the printer apparatus 10.

The operation control processor 46 acquires an operation instruction such as a printing instruction to the printer apparatus 10.

The job management processor 47 manages a job acquired from the command analysis processor 48. Further, the job management processor 47 outputs various instructions relating to printing to the engine control processor 49.

The command analysis processor 48 analyzes the command and printing data given to the printer apparatus 10. Further, the command analysis processor 48 outputs the analysis result of the command to the job management processor 47 and the engine control processor 49.

The engine control processor 49 controls the respective units (the thermal head 23 and the drive motors 131, 151, and 241 (see FIG. 1)) and the like of the printer apparatus 10.

The engine control processor 49 further includes a conveyance control unit 491 and a printing control unit 492.

The conveyance control unit 491 controls conveyance of the label paper 12 and the ink ribbon 22. Further, in the case where printing data has a certain continuous area that does not need to be printed, the conveyance control unit 491 moves the thermal head 23 up and stops the conveyance of the ink ribbon 22 to save ribbons. Further, the conveyance control unit 491 performs conveyance and reverse conveyance of the label paper 12 after printing in accordance with the type of attachment 30 attached to the printer apparatus 10 and the presence or absence of the head-up function of the printer apparatus 10. That is, the conveyance control unit 491 ejects the label paper 12 after printing by just the feeing amount set by the feeding amount setting unit 441. Further, the conveyance control unit 491 conveys the label paper 12 in reverse rotation by just the back-feeding amount set by the back-feeding amount setting unit 442. Note that the conveyance control unit 491 is an example of a feeding control unit and a back-feeding control unit in the present disclosure.

The printing control unit 492 draws the printing data acquired from the command analysis processor 48.

(Various Parameter Configurations of Printer Apparatus)

Various parameters relating to settings of the feeding amount and the back-feeding amount of the label paper 12 in the printer apparatus 10 will be described with reference to FIG. 4. The printer apparatus 10 includes a memory 200 in which a table of the various parameters is stored. FIG. 4 is a diagram describing the configuration of the memory 200 in which a table of various parameters is stored in the printer apparatus 10 according to the embodiment. As shown in FIG. 4, the printer apparatus 10 stores, as various parameters, parameters of the distance Da between a thermal head and a paper ejection port, the attachment extension distance Db, the fine adjustment amount Za, the fine adjustment amount Zb, the gap G between labels, and the minimum label pitch in the memory 200.

The distance Da between a thermal head and a paper ejection port is a distance between the thermal head 23 and the paper ejection port 27 as described with reference to FIG. 2. The distance Da between a thermal head and a paper ejection port is a value that is uniquely determined for each printer apparatus 10.

The attachment extension distance Db is a distance between the paper ejection port 27 and the paper ejection port 31 of the attachment 30 as described with reference to FIG. 2. The attachment extension distance Db is a value that is uniquely determined for each type of attachment 30.

The fine adjustment amount Za is a fine adjustment amount of the feeding amount and the back-feeding amount to be set in the case where the printer apparatus 10 does not have a head-up function. Further, the fine adjustment amount Zb is a fine adjustment amount of the feeding amount and the back-feeding amount to be set in the case where the printer apparatus 10 does not have a head-up function.

Note that the fine adjustment amounts Za and Zb may be further set in accordance with the type of label paper 12.

The gap G between labels is a distance between the labels 122 adjacent to each other as described with reference to FIG. 2. When the conveyed label paper 12 that has been printed is cut by hand or cut by a cutter unit, the feeding amount of the label paper 12 is set so that it can be cut at a position within the range of the gap G between labels. In the case where the feeding amount differs depending on the presence or absence of the head-up function or the type of label paper 12, by setting the above-mentioned fine adjustment amounts Za and Zb, the label paper 12 can be cut at an appropriate position regardless of the presence or absence of the head-up function and the type of label paper 12.

A minimum label pitch Pa is the minimum value of the printable label pitch P to be set in the case where the printer apparatus 10 has a head-up function. Further, a minimum label pitch Pb is the minimum value of the printable label pitch P to be set in the case where the printer apparatus 10 does not have a head-up function.

In the case where the printer apparatus 10 has a head-up function, by conveying the label paper 12 in reverse rotation while the thermal head 23 has ascended, the label 122 does not get caught in the thermal head 23. For this reason, the magnitude relationship between the minimum label pitch Pa and the minimum label pitch Pb satisfies Pa>Pb.

As described above, by setting the minimum label pitches Pa and Pb according to the printer apparatus 10, it is possible to select the label paper 12 on which printing can be performed by the printer apparatus 10.

The printer apparatus 10 stores the table shown in FIG. 4 in the memory 200 in advance, and the above-mentioned setting processor 44 sets various parameters by referring to this table.

(Feeding Amount Setting Processing Performed by Printer Apparatus)

Figure 5:
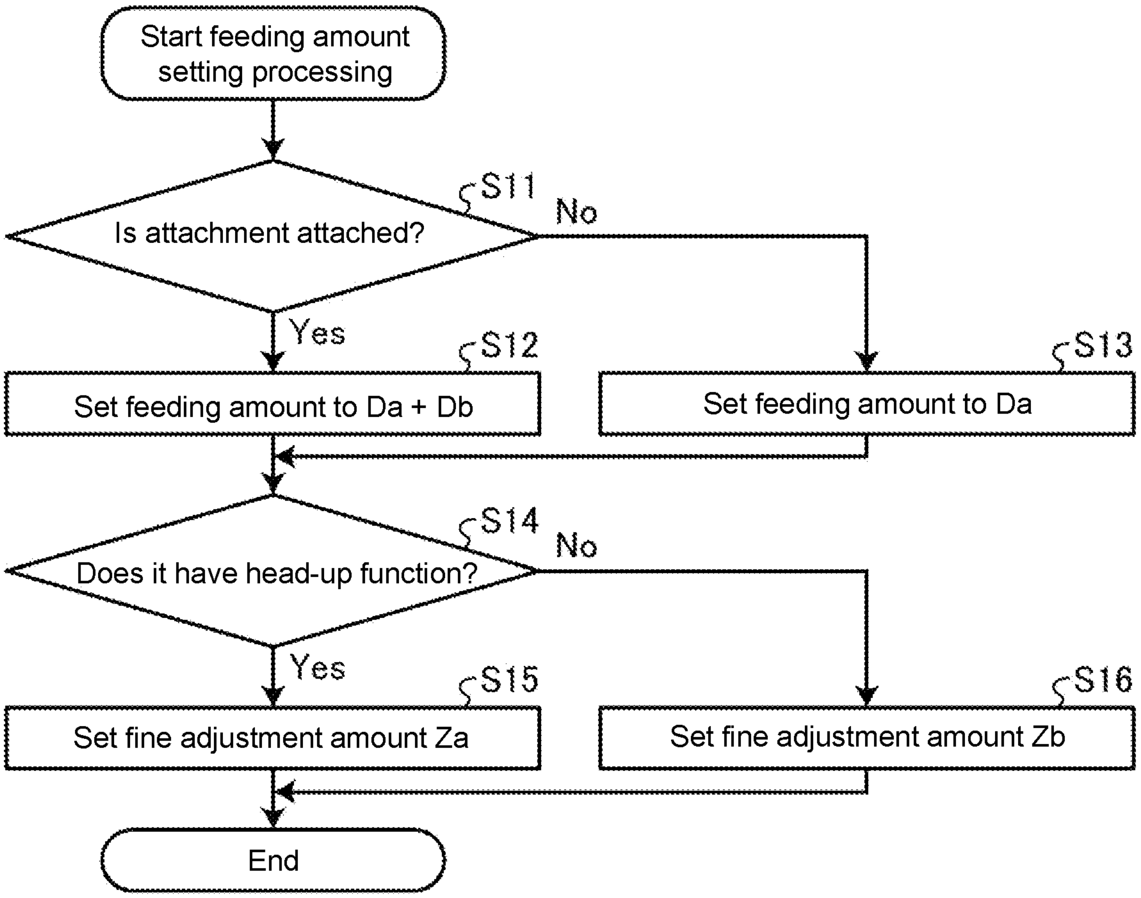
FIG. 5 is a flowchart showing an example of feeding amount setting processing to be performed by the printer apparatus according to the embodiment.

The feeding amount setting processing performed by the processor 100 of the printer apparatus 10 will be described with reference to FIG. 5. FIG. 5 is a flowchart showing an example of feeding amount setting processing performed by the processor 100 of the printer apparatus 10 according to the embodiment. Note that the target of feeding amount setting processing is the printer apparatus 10 in which the label paper 12 having the label pitch P of the minimum label pitch shown in FIG. 4 or more is set.

In Step S11, the attachment information acquisition processor 41 determines whether or not the attachment 30 is attached to the printer apparatus 10. In the case where it is determined that the attachment 30 is attached to the printer apparatus 10 (Step S11: Yes) the processing of the processor 100 proceeds to Step S12. Meanwhile, in the case where it is determined that the attachment 30 is not attached to the printer apparatus 10 (Step S11: No), the processing of the processor 100 proceeds to Step S13.

In the case where it is determined that the attachment 30 is attached to the printer apparatus 10 (Step S11: Yes), the setting processor 44 sets, by the feeding amount setting unit 441, the feeding amount of the label paper 12 after printing to Da+Db in Step S12. After that, the processing of the processor 100 proceeds to Step S14. Note that as described above, Da is a distance between a thermal head and a paper ejection port and Db is an attachment extension distance.

Meanwhile, in the case where it is determined that the attachment 30 is not attached to the printer apparatus 10 (Step S11: No), the setting processor 44 sets, by the feeding amount setting unit 441, the feeding amount of the label paper 12 after printing to Da in Step S13. After that, the processing of the processor 100 proceeds to Step S14.

In Step S14, the presence/absence-of-head-up-function acquisition processor 42 determine whether or not the printer apparatus 10 has a head-up function. In the case where it is determined that the printer apparatus 10 has a head-up function (Step S14: Yes), the processing of the processor 100 proceeds to Step S15. Meanwhile, in the case where it is determined that the printer apparatus 10 does not have a head-up function (Step S14: No), the processing of the processor 100 proceeds to Step S16.

In the case where it is determined that the printer apparatus 10 has a head-up function (Step S14: Yes), the setting processor 44 sets, by the fine adjustment amount setting unit 444, the fine adjustment amount of the feeding amount to Za in Step S15. After that, the processor 100 of the printer apparatus 10 ends the feeding amount setting processing.

Meanwhile, in the case where it is determined in Step S14 that the printer apparatus 10 does not have a head-up function (Step S14: No), the setting processor 44 sets, by the fine adjustment amount setting unit 444, the fine adjustment amount of the feeding amount to Zb in Step S16. After that, the processor 100 of the printer apparatus 10 ends the feeding amount setting processing.

(Back-Feeding Amount Setting Processing Performed by Printer Apparatus)

Figure 6:
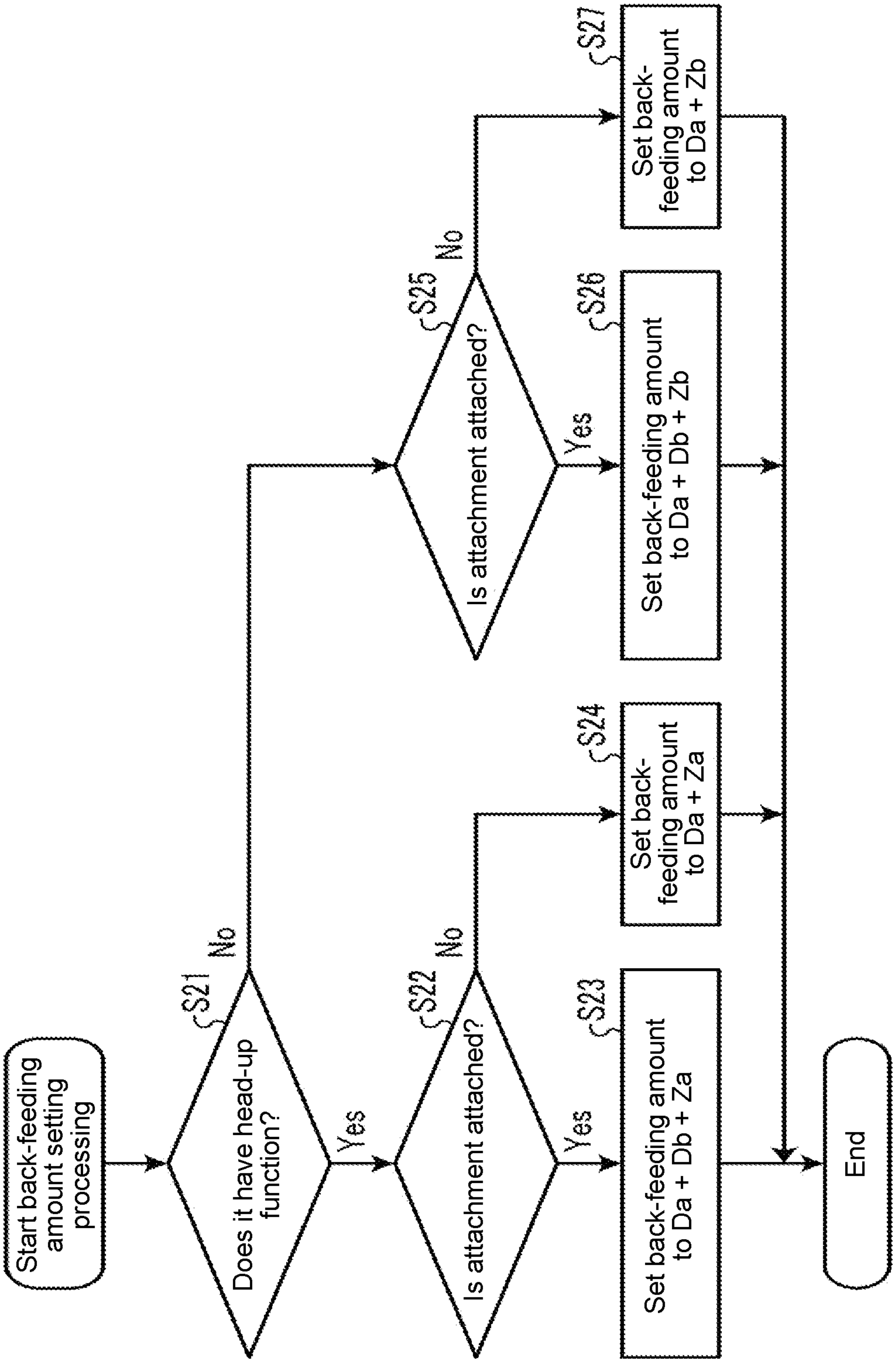
FIG. 6 is a flowchart showing an example of back-feeding amount setting processing performed by the printer apparatus according to the embodiment.

The back-feeding amount setting processing performed by the printer apparatus 10 will be described with reference to FIG. 6. FIG. 6 is a flowchart showing an example of the back-feeding amount setting processing performed by the processor 100 of the printer apparatus 10 according to the embodiment. Note that the target of back-feeding amount setting processing is the printer apparatus 10 in which the label paper 12 is set, the feeding amount setting processing shown in FIG. 5 having been performed on the printer apparatus 10.

In Step S21, the presence/absence-of-head-up-function acquisition processor 42 determines whether or not the printer apparatus 10 has a head-up function. In the case where it is determined that the printer apparatus 10 has a head-up function (Step S21: Yes), the processing of the processor 100 proceeds to Step S22. Meanwhile, in the case where it is determined that the printer apparatus 10 does not have a head-up function (Step S21: No), the processing of the processor 100 proceeds to Step S25.

In the case where it is determined that the printer apparatus 10 has a head-up function (Step S21: Yes), the attachment information acquisition processor 41 determines whether or not the attachment 30 is attached to the printer apparatus 10 in Step S22. In the case where it is determined that the attachment 30 is attached to the printer apparatus 10 (Step S22: Yes), the processing of the processor 100 proceeds to Step S23. Meanwhile, in the case where it is determined that the attachment 30 is attached to the printer apparatus 10 (Step S22: No), the processing of the processor 100 proceeds to Step S24.

In the case where it is determined that the attachment 30 is attached to the printer apparatus 10 (Step S22: Yes), the setting processor 44 sets, by the back-feeding amount setting unit 442, the back-feeding amount of the label paper 12 to Da+Db+Za in Step S23. After that, the processor 100 of the printer apparatus 10 ends the back-feeding amount setting processing.

Meanwhile, in the case where it is determined that the attachment 30 is not attached to the printer apparatus 10 (Step S22: No), the setting processor 44 sets, by the back-feeding amount setting unit 442, the back-feeding amount of the label paper 12 to Da+Za in Step S24. After that, the processor 100 of the printer apparatus 10 ends the back-feeding amount setting processing.

Further, in the case where it is determined that the printer apparatus 10 does not have a head-up function (Step S21: No), the attachment information acquisition processor 41 determines whether or not the attachment 30 is attached to the printer apparatus 10 in Step S25. In the case where it is determined that the attachment 30 is attached to the printer apparatus 10 (Step S25: Yes), the processing of the processor 100 proceeds to Step S26. Meanwhile, in the case where it is determined that the attachment 30 is not attached to the printer apparatus 10 (Step S25: No), the processing of the processor 100 proceeds to Step S27.

In the case where it is determined that the attachment 30 is attached to the printer apparatus 10 (Step S25: Yes), the setting processor 44 sets, by the back-feeding amount setting unit 442, the back-feeding amount of the label paper 12 to Da+Db+Zb in Step S26. After that, the processor 100 of the printer apparatus 10 ends the back-feeding amount setting processing.

Meanwhile, in the case where it is determined that the attachment 30 is not attached to the printer apparatus 10 (Step S25: No), the setting processor 44 sets, by the back-feeding amount setting unit 442, the back-feeding amount of the label paper 12 to Da+Zb in Step S27. After that, the processor 100 of the printer apparatus 10 ends the back-feeding amount setting processing.

Note that although the fine adjustment amount during conveyance and the fine adjustment amount during reverse conveyance have been described to be set to have equal values in FIG. 5 and FIG. 6, the fine adjustment amount during conveyance and the fine adjustment amount during reverse conveyance may be set to have different values in accordance with the type of label paper 12 to be used, or the like.

After ending the feeding amount setting processing in FIG. 5 and the back-feeding amount setting processing in FIG. 6, the printer apparatus 10 receives a printing instruction and executes necessary printing. Since the execution of printing is the same as the processing performed by a general printer apparatus, description thereof is omitted.

OPERATION AND EFFECT OF EMBODIMENT

As described above, the printer apparatus 10 according to the embodiment is a thermal transfer printer apparatus that prints on the label paper 12 (printing paper) by heating the ink ribbon 22 or a thermal printer apparatus that prints on the thermal label paper 12 (printing paper). The printer apparatus 10 includes the attachment information acquisition processor 41, the setting processor 44 (the feeding amount setting unit 441, the back-feeding amount setting unit 442), and the engine control processor 49 (the conveyance control unit 491). The attachment information acquisition processor 41 acquires the distance from the paper ejection port 27 that ejects the label paper 12 printed by the printer apparatus 10 to the paper ejection port 31 of the attachment 30 (the attachment extension distance Db) connected to the paper ejection port 27. The setting processor 44 sets, by the feeding amount setting unit 441, the feeding amount of the label paper 12 after printing when the label paper 12 after printing is ejected from the paper ejection port 31 of the attachment 30 in accordance with the acquired attachment extension distance Db. The engine control processor 49 conveys, by the conveyance control unit 491 (feeding control unit), the label paper 12 by just the set feeding amount in order to eject the label paper 12 after printing. Further, the setting processor 44 sets, by the back-feeding amount setting unit 442, the back-feeding amount when conveying the label paper 12 ejected from the paper ejection port 31 of the attachment 30 to the position for the next printing in reverse rotation in accordance with the presence or absence of the head-up function of the printer apparatus 10. Further, the engine control processor 49 conveys, by the conveyance control unit 491 (back-feeding control unit), the label paper 12 in reverse rotation by just the set back-feeding amount. Therefore, it is possible to set an appropriate feeding amount and an appropriate back-feeding amount in accordance with the presence or absence of the head-up function of the printer apparatus 10, and thus, it is possible to reliably prevent the label 122 from getting caught in the thermal head 23 (print head) when conveying the conveyed label paper 12 in rotation in preparation for the next printing.

Further, in the printer apparatus 10 according to the embodiment, the feeding amount setting unit 441 of the setting processor 44 sets, as a feeding amount, the distance obtained by adding the distance that the label paper 12 (printing paper) passes through the attachment 30 to the distance between the thermal head 23 (print head) and the paper ejection port 27 of the printer apparatus 10. Therefore, it is possible to set an appropriate feeding amount in accordance with the type of attachment 30 attached to the printer apparatus 10.

Further, the setting processor 44 of the printer apparatus 10 according to the embodiment further sets, by the fine adjustment amount setting unit 444, the fine adjustment amounts Za and Zb of the feeding amount in accordance with the presence or absence of a head-up function. Therefore, it is possible to realize an accurate feeding amount in accordance with the presence or absence of the head-up function of the printer apparatus 10.

In the printer apparatus 10 according to the embodiment, printing paper is the label paper 12 in which the plurality of labels 122 is placed on the mounting paper 121 at predetermined intervals. Therefore, even with printing paper in which the thick label 122 is attached to the mounting paper 121, it is possible to prevent the label 122 from getting caught in the thermal head 23 during reverse conveyance.

Further, the setting processor 44 of the printer apparatus 10 according to the embodiment further sets, by the minimum label pitch setting unit 443, the minimum value of the label pitch that is the interval between upstream end portions of the labels 122 adjacent to each other in the label paper 12 (printing paper) or the interval between downstream end portions of the labels 122 adjacent to each other in the label paper 12 (printing paper) in accordance with the presence or absence of a head-up function. Therefore, it is possible to select the label paper 12 on which printing can be performed by the printer apparatus 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer apparatus comprising:
- a print head for printing on printing paper;
- a casing that includes a paper ejection port for ejecting printed printing paper;
- an attachment that includes a paper ejection port for receiving the printing paper ejected from the casing and then ejecting the received printing paper and is attachable to and detachable from the paper ejection port of the casing;
- a conveying device that conveys the printing paper after printing in forward rotation to eject the printing paper from the paper ejection port of the attachment and conveys the printing paper in reverse rotation for next printing;
- an information acquisition processor that acquires information of a distance from the paper ejection port of the casing to the paper ejection port of the attachment;
- a setting processor that
  - sets, in accordance with the acquired information of the distance, a distance obtained by adding a distance that the printing paper passes through the attachment to a distance between the print head and the paper ejection port of the casing as a feeding amount of the printing paper after printing when ejecting the printing paper after printing from the paper ejection port of the attachment, and
  - sets, in accordance with presence or absence of a head-up function of moving the print head between a first position where printing on the printing paper is available and a second position where printing on the printing paper is not available, a back-feeding amount when conveying the printing paper ejected from the paper ejection port of the attachment to a position for next printing in reverse rotation; and
- an engine control processor that
  - causes the conveying device to convey the printing paper in forward rotation by the set feeding amount to eject the printing paper after printing, and
  - causes the conveying device to convey the printing paper in reverse rotation by the set back-feeding amount to return the printing paper to a next printing position before next printing.

2. The printer apparatus according to claim 1, wherein
- the conveying device includes a platen roller that sandwiches the printing paper between the platen roller and the print head, and
- the printing paper is sandwiched between the platen roller and the print head when the print head is at the first position not sandwiched between the platen roller and the print head when the print head is at the second position.

3. The printer apparatus according to claim 2, wherein
- the conveying device is provided on an upstream side in a conveying direction in forward rotation of the printing paper than a position where the printing paper is sandwiched between the print head and the platen roller, and conveys the printing paper in forward rotation and reverse rotation while sandwiching the printing paper.

4. The printer apparatus according to claim 1, wherein
- the setting processor sets a fine adjustment amount of the feeding amount in accordance with the presence or absence of the head-up function.

5. The printer apparatus according to claim 1, wherein
- the setting processor
  - sets a first fine adjustment amount of the feeding amount in the presence of the head-up function, and
  - sets a second fine adjustment amount of the feeding amount different from the first fine adjustment amount in the absence of the head-up function.

6. The printer apparatus according to claim 1, wherein
- the printing paper is label paper in which a plurality of labels is placed on mounting paper at predetermined intervals.

7. The printer apparatus according to claim 6, wherein
- a label pitch that is a predetermined interval of the plurality of labels is an interval between upstream end portions of labels adjacent to each other in the label paper or an interval between downstream end portions of labels adjacent to each other in the label paper.

8. The printer apparatus according to claim 7, wherein
- the setting processor sets a minimum value of the label pitch in accordance with the presence or absence of the head-up function.

9. The printer apparatus according to claim 6, wherein
- the setting processor
  - sets a first minimum value of the label pitch in the presence of the head-up function, and
  - sets a second minimum value of the label pitch smaller than the first minimum value in the absence of the head-up function.

* * * * *